(No Model.)

P. DE LACHOMETTE.
PROCESS OF MAKING AMMONIUM SULPHITE.

No. 452,378. Patented May 19, 1891.

Witnesses.
Paul Ruby
Alphonse Bléiry

Inventor:
Prosper de Lachomette
By Singer & Titner
Attorneys

UNITED STATES PATENT OFFICE.

PROSPER DE LACHOMETTE, OF LYONS, FRANCE.

PROCESS OF MAKING AMMONIUM SULPHITE.

SPECIFICATION forming part of Letters Patent No. 452,378, dated May 19, 1891.

Application filed April 28, 1888. Serial No. 272,183. (No specimens.) Patented in France July 4, 1887, No. 184,600, and in England December 10, 1887, No. 17,050.

*To all whom it may concern:*

Be it known that I, PROSPER DE LACHOMETTE, civil engineer, of Lyons, in the Republic of France, have invented a new or Improved Process for the Manufacture of Sulphite and Bisulphite of Ammonia, (for which I have obtained Letters Patent of France for fifteen years, No. 184,600, dated July 4, 1887, and of Great Britain, No. 17,050, dated December 10, 1887;) and I do hereby declare that the following is a full and exact description thereof, reference being made to the accompanying drawings.

The object of this invention is to utilize the sulphur contained in crude illuminating-gas and in the crude ammoniacal liquor from gas-works for the production of sulphite and bisulphite of ammonia. This sulphur is taken up by the purifying material, and has heretofore been lost in most works, having been employed in certain cases only for the manufacture of sulphuric acid.

In the process forming the subject of the present invention, the ammoniacal liquors are purified by means of oxide of iron, which removes from them all the sulphur they contain. This purification is effected by filtering the liquors through the oxide, or by mixing them with the oxide and then decanting. Oxide of iron has already been employed for the purification of crude illuminating-gas, but never, so far as I am aware, for the purification of crude ammoniacal liquor from gas-works. The materials which have been used for the purification of the ammoniacal liquor, as also those of an analogous character which have been used in the purification of gas, usually contain about fifty per cent. of free sulphur, and are employed in the apparatus hereinafter described for the production of sulphurous acid. The ammoniacal liquors, after having been purified as above described, may be distilled without the addition of lime, and thus serve for the production of ammonia in the gaseous state. The two gases thus formed—namely, sulphurous and ammoniacal gases—are conducted into the apperatus hereinafter described. By their combination they produce a salt—namely, sulphite of ammonia.

Figure 1:
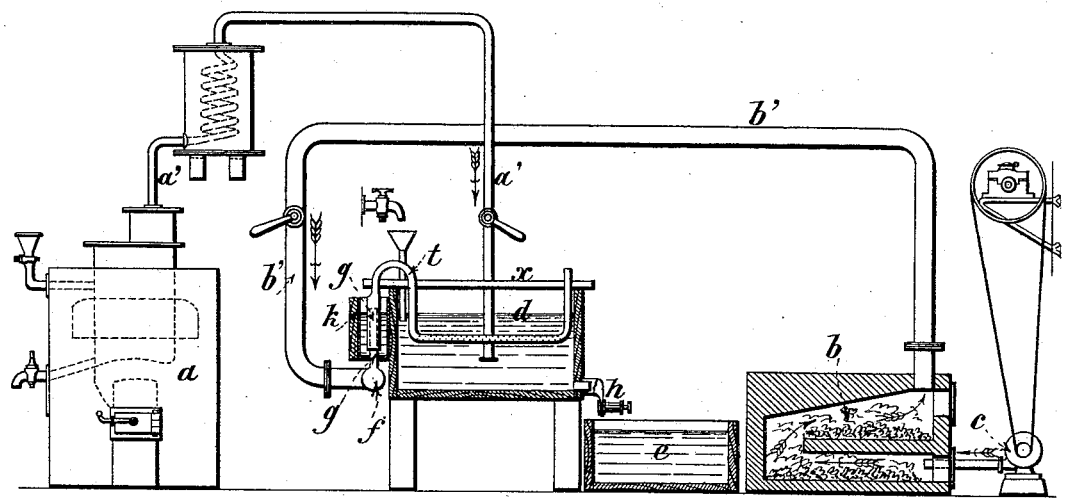

In the drawings hereto annexed, Figure 1 illustrates in vertical section the apparatus for manufacturing the sulphite of ammonia.

The apparatus comprises—

First, a suitable apparatus *a* for distilling the ammoniacal liquor, so as to produce dry ammonia, which passes off by the pipe *a'*.

Secondly, a furnace *b* for the production of sulphurous acid by burning or roasting the oxide of iron which has been used for purifying crude ammoniacal liquors from gas-works, or crude illuminating-gas. This furnace may be arranged for burning or roasting either the purifying materials above described, pyrites, or sulphur. Air is supplied to this furnace, under pressure, by means of a fan *c*, or any other suitable blowing apparatus. This fan or other apparatus, capable of drawing and forcing the necessary quantity of air or gas, may be placed with advantage between the furnace and the tank or vat where the sulphite of ammonia is to be formed—that is to say, this drawing and forcing apparatus should be capable of drawing away the sulphurous-acid gas formed by the combustion of the sulphur and of forcing it into the tank or vat where salt is formed.

Figure 2:
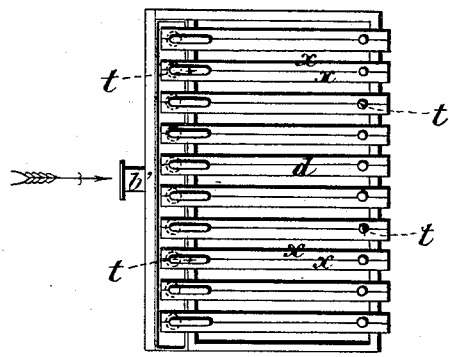

Thirdly, a saturating tank or vat *d*, (shown in plan in Fig. 2,) and, fourthly, one or more crystallizing-vats *e*.

The sulphurous acid is conducted from the furnace *b* by a pipe *b'* into a distributing-pipe *f*, on which are fixed or formed pipes *g*, which pass liquid-tight through the bottom of the tank *k* and rise above the water contained therein. The ends of the pipes *t* are passed over the pipes *g*, so as to form lutes or hydraulic joints in the small tank *k*. These pipes *t* are perforated with small holes in those parts of them which are immersed in the liquid in the vat *d*. The sulphurous-acid gas escapes through these small holes into the said vat *d*. The pipes *t* are pinched between and supported by wooden rods *x x*, fastened together by screws, and the pipes can thereby be raised or lowered at pleasure. This arrangement is convenient, because it enables the apparatus to be put together or taken to pieces with facility. The ammonia and sulphurous-acid gases are conducted by the two pipes *a'* and *b'*, under a pressure of about ten centimeters of water, into the vat $d$, containing water. The two gases combine in this water and form sulphite of ammonia, which immediately dissolves, and the liquid becomes heated by the reaction, which raises its point of saturation. When the liquid is saturated in the vat $d$, water is added on the surface, and the heavier saturated liquid is drawn off through the pipe $h$ into the vat $e$, where the crystals are deposited by the cooling which then takes place. The mother-liquor is returned to the vat $d$ at the same time as the water intended to replace that of crystallization. In this way the manufacture is carried on continuously. The crystallization may also be effected directly, and the salt collected in the vat $d$ by stopping the action and allowing the saturated liquid to cool by simply allowing the salt crystals to deposit by supersaturation.

The important feature in this new process is that the two gases are brought at the same time into a saturated liquid, which allows of the immediate crystallization of the salt formed without the necessity of having recourse to evaporation. The delivery of ammoniacal and sulphurous-acid gas into the vat is regulated so that the liquid is always neutral, in order to avoid loss of gas; but the process may be carried on with alkaline liquors, provided that the excess of alkali is not too great. This method of operating avoids the loss of ammonia and sulphurous acid occurring in those processes which consist either in introducing sulphurous acid into a solution of ammonia or in introducing ammonia into a solution of sulphurous acid. In these two cases the loss of ammonia and sulphurous acid is considerable, and crystallization can only be effected by evaporation, because it is impossible in practice to obtain by these means a saturated liquid.

By this new process crystallized sulphite of ammonia is obtained, which may be transformed by slow oxidation in contact with air into sulphate of ammonia; but the sulphite of ammonia may be used directly in the arts, and especially as manure in agriculture, whereby as good and even better results can be obtained than by the use of sulphate, as it either assimilates more completely or is transformed in the soil into compounds which are assimilable in the highest degree. The reactions may be effected, if preferred, in closed vessels by arranging several saturating-vats one after the other. In this manner the gases which are not absorbed in the first vat would be absorbed in the second, those not absorbed in the second would be absorbed in the third, and so on.

The advantages resulting from the process and apparatus above described may be summarized as follows: First, the purification of the ammoniacal liquors by the use of oxide of iron, which enables such liquors to be distilled subsequently without the addition of lime; second, the utilization of the sulphur contained in the materials which have been used in the purification of the ammoniacal liquor and gas, which materials may be employed again for the purification of ammoniacal liquors and gas after the sulphur they contain has been burned out of them; third, the production, by a simple and inexpensive apparatus, of a white crystallized ammoniacal salt, which may be used directly as manure in agriculture, for the production of sulphurous acid for the production of cold, (the solution in water of an equal weight of sulphurous acid produces a reduction of temperature of 15° centigrade,) or for other purposes.

With the same apparatus and by the same process bisulphate of ammonia may be manufactured.

To produce bisulphite it is only necessary to conduct the sulphurous-acid and ammonia gases into the vat $d$ in proper proportions—namely, one equivalent of ammonia to two equivalents of sulphurous acid—or to conduct the sulphurous acid into a solution of sulphite. It will be seen that one equivalent of water is liberated.

In the same way that sulphite can be transformed into bisulphite by adding to it one equivalent of sulphurous acid; so, likewise, bisulphite may be transformed into sulphite by adding to it an equivalent of ammonia. If these two last transformations are made in a suitable volume of water, there will be formed a considerable quantity of crystals of sulphite without the necessity of cooling the liquid. It is obvious that if one begins with a saturated solution of sulphite there will be at the end of the operation twice the quantity of salt in the same volume of liquid that this volume is capable of dissolving one-half of such salt will therefore be deposited. Supposing, for example, that we operate, as in the above case, on quantities corresponding to the chemical equivalents, we shall start with, for example, sixty-seven kilograms of sulphite, which, with thirty-two kilograms of sulphurous acid, will give ninety kilograms of bisulphite with nine kilograms of water. By adding eighteen kilograms of water and seventeen kilograms of ammonia we shall obtain one hundred and thirty-four kilograms of neutral sulphite. The quantity of water serving for the solution of the salt at the beginning of the operation not having varied, the formation of these one hundred and thirty-four kilograms of sulphite will be effected in a quantity of water which can only dissolve sixty-seven kilograms of that salt, and there will consequently be a crystallization or deposit of the remaining sixty-seven kilograms of salt. It is obvious that the quantity of salt deposited will be less, if more water is added, than is strictly necessary for the formation of the salt, and the quantity of salt deposited may be greater if a smaller quantity of water be added.

The bisulphite of ammonia may be obtained by saturating with sulphurous acid a solution of sulphite of ammonia. On the other hand, the sulphite of ammonia may be obtained by saturating with ammonia a solution of bisulphite of ammonia. These operations may be effected successfully in the same vat or in separate closed or open vats. It may also be observed that before utilizing the materials which have been used for purifying gas and ammoniacal liquor, for the production of sulphurous acid, they may be treated for the extraction from them of the cyanides and the ammoniacal salts that they usually contain in considerable quantity.

The processes above described are applicable, not only in gas-works, but in all establishments and works in which ammoniacal liquors are produced. In those establishments and works where purifying materials for coal-gas are not employed sulphur or pyrites would be burned or roasted in the furnace to produce the sulphurous-acid gas.

I claim—

1. The process of making ammonium sulphite or bisulphite, consisting in, first, purifying ammoniacal liquors; second, distilling the ammonia resulting from said purification; and, third, conducting dry ammonia and sulphurous gas in suitable proportions into a saturating-tank, substantially as described.

2. The process of making ammonium sulphite or bisulphite, consisting in, first, purifying the crude ammoniacal liquors with oxide of iron and then distilling said purified ammoniacal liquor; second, roasting the oxide of iron which has been used in purifying said crude ammoniacal liquids, and, third, conducting dry ammonia resulting from the distillation and sulphurous gas resulting from the roasting of the impure oxide of iron together in suitable proportions into a saturating-tank, substantially as described.

PROSPER DE LACHOMETTE.

Witnesses:
   ROBT. M. HOOPER,
   ALPHONSE BLÉTRY.